United States Patent [19]

Evers et al.

[11] Patent Number: 5,008,346
[45] Date of Patent: Apr. 16, 1991

[54] GRAFT COPOLYMERS OF POLY(P-PHENYLENE BENZBISIMIDAZOLE)

[75] Inventors: Robert C. Evers, Dayton; Thuy D. Dang, Springfield, both of Ohio; D. Roger Moore, Clute, Tex.

[73] Assignee: The United States of America as represented by the Secretary of the Air Force, Washington, D.C.

[21] Appl. No.: 345,251

[22] Filed: Apr. 28, 1989

[51] Int. Cl.$^5$ .............................................. C08L 79/04
[52] U.S. Cl. .................................... 525/426; 525/430; 525/435
[58] Field of Search ....................... 525/426, 530, 435

[56] References Cited

U.S. PATENT DOCUMENTS

| | | | |
|---|---|---|---|
| 4,108,835 | 8/1978 | Arnold et al. | 528/183 |
| 4,207,407 | 6/1980 | Helminiak et al. | 525/425 |
| 4,377,546 | 3/1983 | Helminiak et al. | 264/232 |
| 4,398,009 | 8/1983 | Ahne et al. | 525/426 |
| 4,544,713 | 10/1985 | Tsai et al. | 525/432 |
| 4,614,784 | 9/1986 | Kozakiewicz | 527/313 |
| 4,835,246 | 5/1989 | Tsai et al. | 528/337 |

*Primary Examiner*—Ana L. Carrillo
*Attorney, Agent, or Firm*—Charles E. Bricker; Donald J. Singer

[57] ABSTRACT

A fusible, rod-like, graft copolymer having repeating units of the formula:

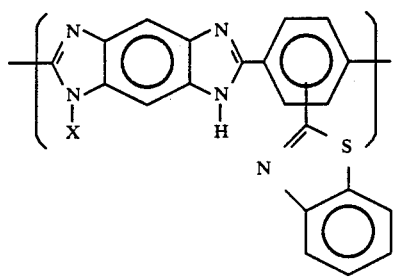

wherein X is $(-CH_2CH_2CONH-)_m$ or $(-CH_2-CH(CH_3)-O-)_n$, wherein m has an average value of 5.0 to 35.0 and n has an average value of 1.0 to 30.0.

3 Claims, No Drawings

GRAFT COPOLYMERS OF POLY(P-PHENYLENE BENZBISIMIDAZOLE)

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic heterocyclic graft copolymers.

In general, the class of aromatic heterocyclic extended claim polymers are well known for their outstanding thermal, physical and chemical properties Considerable research has been directed toward using poly(p-phenylene benzbisazole) polymers as the reinforcing elements in polymeric composites. These polymers, also known as rigid-rod polymers, have a high modulus and high strength, and can act as reinforcing elements similar to the reinforcement provided by chopped fibers, but with the reinforcement taking place at the molecular level.

Helminiak et al . U S. Pat. Nos. 4.207.407 and 4 377.546disclose polymeric alloys comprising rod-like aromatic heterocyclic polymers and flexible, coil-like heterocyclic polymers. These alloys are prepared by first dissolving the rigid-rod and coil-like heterocyclic polymers in methanesulfonic acid (MSA).

Rod-like polymers are generally soluble only in strong acids and form lyotropic solutions in these solvents e.g. polyphosphoric acid and methanesulfonic acid, however, relatively few flexible, coil-like polymers can be dissolved or are stable in methanesulfonic acid. The rod-like polymers are generally infusible, i.e. they degrade before melting, thus preventing solid-state processing. What is desired are rigid-rod heterocyclic polymers which are fusible.

Accordingly, it is an object of the present invention to proVide rigid-rod heterocyclic polymers which are fusible.

Other objects and advantages of the present invention will be apparant to those skilled in the art from a reading of the following detailed description of the invention.

SUMMARY OF THE INVENTION

In accordance with the present invention there is provided a fusible, rod[like, graft copolymer having repeating units of the formula:

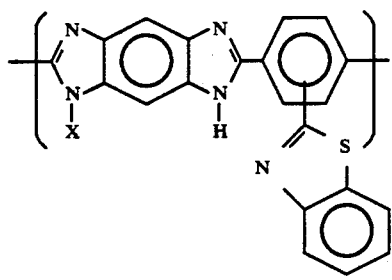

wherein X is (—CH$_2$CH$_2$CONH—)$_m$ or (—CH$_2$—CH(CH$_3$)—O—)$_n$, wherein m has an average value of 5.0 to 35.0 and n has an average value of 1.0 to 30.0.

The graft polymers of this invention are prepared according to the following reaction scheme:

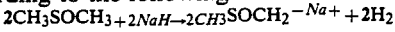
2CH$_3$SOCH$_3$ + 2NaH → 2CH$_3$SOCH$_2^{-Na+}$ + 2H$_2$

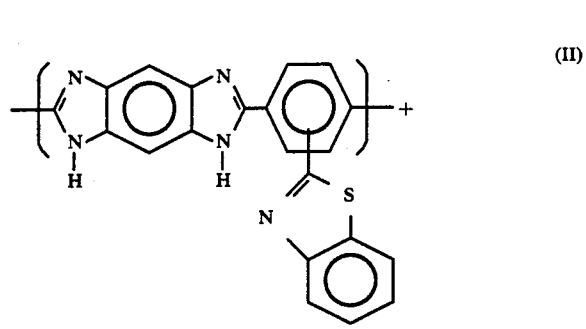
(II)

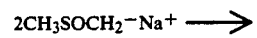
2CH$_3$SOCH$_2^-$Na$^+$ ⟶

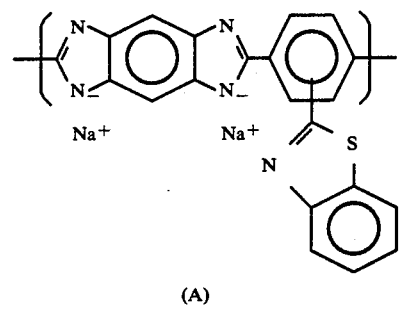
(A)

A + CH$_2$=CHCONH$_2$ ⟶

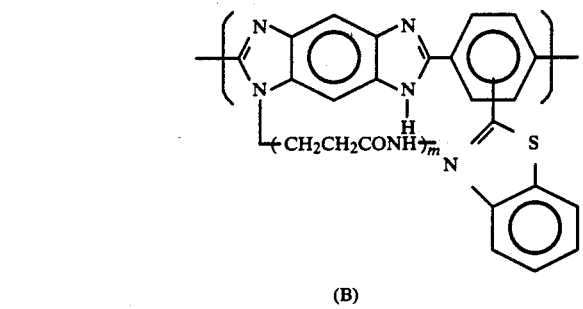
(IIIa)

(B)

A + CH$_3$—CH——CH$_2$ ⟶
        \O/

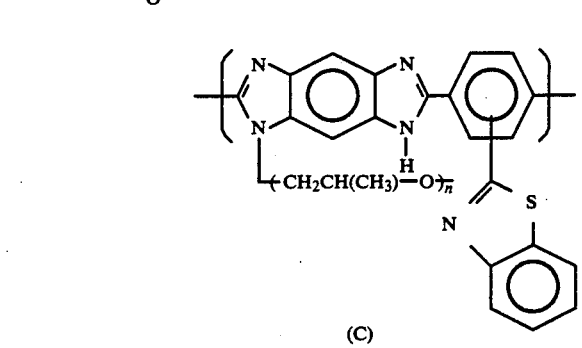
(IIIb)

(C)

The poly(p-phenylenebenzbisimidazole having a pendant benzthiazole group (PPBI) may be prepared as disclosed by Tsai et al s/n 07/085,094, filed Aug. 13, 1987, which is incorporated herein by reference.

Solution of the sodium hydride in dimethylsulfoxide (Step I) is straightforward. Those skilled in the art will recognize that the DMSO should be completely dry and that the process should be carried out under ann inert atmosphere.

In step II, the PPBI is added to the solution of NaH/DMSO The mixture is then heated, with stirring, to a temperature of about 35° to 65° C for about 4 to 36 hours, or until solubilization of the PPBI is complete and the mixture is homogeneous.

In step III the graftable monomer acrylamide (step III a) or propylene oxide (step IIIb) is added to be solubilized pPBI mixture and grafted onto the PPBI under conditions appropriate to the monomer. In the case of the acrylamide, the mixture is heated, with stirring, to a temperature of 100° to 125° C for about 4 to 32 hours. In the case of propylene oxide, the mixture is heated, with stirring, to a temperature of about 25° to 40° C for about 4 to 32 hours.

The amount of graftable monomer charged to reaction step III can range from 1 to 100, preferably 10 to 50 moles per mole of PPBI.

The graft coPolymers are recovered from the reaction mixture using procedures known in the art.

The following examples illustrate the invention:

EXAMPLE I

Graft Polymerization of Acrylamide with PPBI

A 250 ml three-necked round-bottom flask equipped with a mechanical stirrer thermometer, and nitrogen inlet and outlet was charged with 50 grams of DMSO. The solvent was stirred under nitrogen for 30 minutes, after which time 0.22 grams of sodium hydride was added as a 60% disPersion in oil. The solution was heated to 75° C for a period of one hour, during which time the sodium hydride dissolved and the solution took on a greenish tint The solution was then cooled to 40° C, and 1.00 grams of PPBI ($\eta_{inh} = 1.13$/g) (methanesulfonic acid, 30° C, 0.25 g/dl) was added. The solution was stirred for 16 hours at 40° C. and became homogeneous during this period. The solution was heated to 60° C for 2 hours to insure complete solubilization.

A 250 ml three-necked round-bottom flask equipped with a mechanical stirrer, thermometer, and nitrogen inlet and outlet was charged with 25 grams of the above PPBI solution in DMSO. 4.86 grams of acrylamide (AC) and 25 grams of DMSO. The flask was placed in a constant temperature bath at 115° C for a period of 16 hours, during which time the solution became hazy and finally precipitated the copolymer. The cooled solution was poured into 1000 ml of water and allowed to stir until all the copolymer was broken up into a fine suspension. The copolymer (pPBI-g-nylon-3) was carefully collected and dried in vacuo for 24 hours. Yield was 3.48 grams, 64.9% of theoretical. An $\eta_{inh}$ of 0.68 dl/g (methanesulfonic acid, 30° C. 0.25 g/dl) was recorded.

EXAMPLE II

Graft polymerization of propylene Oxide with PPBI

Into a 100 ml round bottom flask equipped with a mechanical stirrer, thermometer, and nitrogen inlet and outlet was charged 100 g of distilled DMSO and 0.66 g of sodium hydride. The suspension was stirred at room temperature under nitrogen for 30 minutes and then heated up to 75° C for one hour during which time the NaH completely dissolved and a clear, slightly greenish solution resulted. The solution was than cooled to 40° C. and 3.0 g of PPBI ($\eta_{inh} = 3.20$ dl/g) (methanesulfonic acid, 30° C, 0.25 g/dl) was added and stirred for 24 hours at this temperature. The resultant suspension became homogenous during this period and was converted into a deeP red solution. It was heated at 60° C for 2 more hours to insure completely solubilization.

The solution was then cooled to 30° C, and 13.064 g of propyleneoxide (PO) and 150 g of distilled DMSO were added. The mixture was stirred under slightly positive nitrogen pressure for 24 hours during which time the mixture became increasingly viscous. The cooled mixture was poured into 2000 ml of dilute hydrochloric acid and allowed to stir until the copolymer was broken into a fine suspension. The copolymer was filtered and extracted in a Soxhlet extraction apparatus with water, then with acetone for 24 hours. The copolymer was dried under vacuum at 100° C for 24 hours. The yield was 6.80 g, 41.6% theoretical yield (based on weight of PPBI). An $\eta_{inh}$ of 2.78 dl/g (methanesulfonic acid, 30° C. 0.25 g/dl) was recorded for PPBI-g-PPO.

EXAMPLE III

Several further PPBI-g-Nylon-3 and PPBI-g-PPO graft copolymers were prepared following the procedures given in Examples I and II. The solubilities of these graft copolymers in a variety of solvents are shown in Tables I and II. below. The intrinsic viscosites were measured in methanesulfonic acid, 30° C, 0.25g/dl. Solubility codes are: S-soluble, W-swells. I-insoluble.

TABLE I

| | PPBI-g-NYLON-3 | | | |
|---|---|---|---|---|
| | A | B | C | D |
| Charge Composition (AC/PPBI) | | | | |
| wt/wt | 91.7/9.3 | 91.7/9.3 | 82.9/17.1 | 59.1/40.3 |
| mole/mole | 50/1 | 50/1 | 25/1 | 10/1 |
| % Yield | 46.7 | 64.9 | 64.2 | 65.0 |
| % Conversion of AC | 41.2 | 61.3 | 56.8 | 65.0 |
| Copolymer Composition (Nylon-3/PPBI) | | | | |
| wt/wt | 80/20 | 86/14 | 73/27 | 38/62 |
| $\eta_{inh}$(PPBI) | 1.13 | 1.13 | 1.13 | 1.13 |
| $\eta_{inh}$(Copolymer) | 0.82 | 0.68 | 1.02 | 2.46 |
| Solubility | | | | |
| 97% HCOOH | S | S | S | W |
| DMAC/LiCL | W | — | — | — |

With regard to Table I, all the grafting reactions were run under a nitrogen sweep. In run A, the solvent was DMSO/Dimethyl acetamide-LiCl 50/50 wt/wt.

TABLE II

| | PPBI-g-PPO | | | | | | |
|---|---|---|---|---|---|---|---|
| | A | B | C | D | E | F | G |
| Charge Composition (PO/PPBI) | | | | | | | |

TABLE II-continued

| | PPBI-g-PPO | | | | | | |
|---|---|---|---|---|---|---|---|
| | A | B | C | D | E | F | G |
| wt/wt | 88.8/11.2 | 79.9/20.1 | 66.5/33.5 | 54.4/45.6 | 79.9/20.1 | 79.9/20.1 | 88.8/11.2 |
| mole/mole | 50/1 | 25/1 | 12/1 | 7.5/1 | 25/1 | 25/1 | 50/1 |
| % Yield | 26 | 23 | 41 | 56 | 34 | 42 | 34 |
| % Conversion of PO | 17 | 4 | 12 | 19 | 18 | 27 | 27 |
| Copolymer Composition (PPO/PPBI) | 57/43 | 14/86 | 19/81 | 18/82 | 41/59 | 52/48 | 67/33 |
| $\eta_{inh}$(PPBI) | 3.20 | 2.80 | 2.80 | 2.80 | 3.20 | 3.20 | 3.65 |
| $\eta_{inh}$(Copmr) | 2.85 | 2.65 | 2.01 | 2.03 | 2.88 | 2.78 | 1.35 |
| Solubility | | | | | | | |
| 97% HCOOH | W | S | S | S | S | S | W |
| CF$_3$COOH | W | S | S | S | S | S | W |
| DMAC/LiCL | W | W | W | W | W | W | W |
| DMSO | W | W | W | W | W | W | W |
| THF | I | I | I | I | I | I | I |
| NMP | I | I | I | I | I | I | I |

With regard to Table II, runs A–D were run under a nitrogen sweep, run E was run in a sealed tube; runs F–G were run under slight nitrogen pressure.

The graft copolymers were obtained as fibrous, light brown materials. The successful incorporation to PPO or nylon-3 into the rigid-rod Polymers structure was substantiated by infrared spectral analysis. In the case of PPBI-g-nylon-3, bands due to nylon-3 at 3300, 2950-2900, 1675, and 1580 cm$^{-1}$ Were obserVed, attributable to N—H, C—H, C=O, and N—C=O groups respectively. These spectra also overlap the PPBI main structural bands at 3400 and 1675 cm$^{-1}$ which makes quantitation of the copolymer composition by infrared spectroscopy impossible. With PPBI-g-PPO strong absorptions were observed at 2900—2950 and 1100 cm$^{-1}$, attributable to C—H and C—O stretching vibrations of PPO. respectively. The absorptions at 3400 cm$^{-1}$. attributable to the N—H stretching vibration of the benzimidazole ring is very substantially diminished, indicative of successful grafting at that site in the rod-like polymers chain.

The solubility of PPBI was considerably modified by the grafting procedures. While PPBI is soluble only in polyphosphoric acid and methanesulfonic acid, the graft copolymers exhibited solubility in methanesulfonic acid as well as other organic solvents such as 97% formic acid and trifluoroacetic acid.

Thermooxidative stability of the rod-like polymers was substantially lowered by the incorporation of nylon-3 or PPO into the polymer structure. Due to the aliphatic structure of the grafted side-chains, onset of breakdown under thermogravimetric analysis in an air atmosphere occurred in the 250–275° C. range With almost complete weight loss occurring by 650° C.

While differential scanning calorimetry did not indicate any softening behavior in either PPBI-g-nylon-3 or PPBI-g-PPO, it was found that the latter coPolymer could be processed into molded specimens through the application of elevated temperature and pressure. For example a one-gram (sample of PPBI-g-PPO (Run F) was heated for one hour in a steel mold at 375–450° F. and 750 psi to give a well consolidated tensile bar.

Under the present invention, graft copolymers of rod-like (P-Phenylenebenzobisimidazole) structures can be synthesized through stepwise grafting of flexible polypropyleneoxide or nylon-3 side-chains into the rod-like structure. The present invention provides a method for dissolving the rod-like polymers in a basic medium and the stepwise grafting of the flexible side-chain into the polymer backbone, thus beneficially imparting improved solubility to the parent polymer. In addition, the rod-like copolymer is fusible and suitable for neat melt processing into bulk forms which exhibit good mechanical properties. PPBI-g-PPO thus effectively functions as a one-part molecular composite in which both the rigid-rod polymer and fusible host are contained within a single polymer molecule.

Various modifications may be made to the invention as described without departing from the spirit of the invention or the scope of the appended claims.

We claim:

1. A fusible, rod-like, graft copolymer having repeating units of the formula:

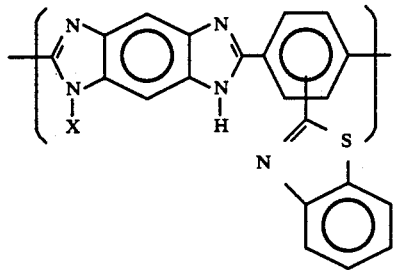

wherein X is (—CH$_2$CH$_2$CONH—)m or (—CH$_2$—CH(CH$_3$)—O—)n. wherein m has an average value of 5.0 to 35.0 and n has an average value of 1.0 to 30.0.

2. The copolymer of claim 1 wherein X is (—CH$_2$CH$_2$CONH—)m.

3. The copolymer of claim 1 wherein X is (—CH$_2$—CH(CH$_3$)—O—)n.

* * * * *

UNITED STATES PATENT AND TRADEMARK OFFICE
CERTIFICATE OF CORRECTION

PATENT NO. : 5,008,346          Page 1 of 2

DATED : April 16, 1991

INVENTOR(S) : Robert C. Evers et al

It is certified that error appears in the above-identified patent and that said Letters Patent is hereby corrected as shown below:

```
Col 1, line 14, a period should not follow "In".
Col 1, line 25, "4.207.407" should be -- 4,207,407 --.
Col 1, lines 25-26 "4 377.546" should be -- 4,377,546, --.
Col 1, line 25, first period should be a comma.
Col 1, line 26, a space should precede "disclose".
Col 1, line 41, "proVide" should be -- provide --.
Col 1, line 51, "rod[like" should be -- rod-like --.
Col 2, line 3, the equation should be labeled -- (I) --.
Col 3, line 4, "ann" should be -- an --.
Col 3, line 7, a period should follow "NaH/DMSO".
Col 3, line 13, "pPBI" should be -- PPBI --.
Col 3, line 23, "coPolymers" should be -- copolymers --.
Col 3, line 30, a comma should follow "stirrer".
Col 3, line 34, "disPersion" should be -- dispersion --.
Col 3, line 37, a period should follow "tint".
Col 3, line 40, the first period should be a comma.
Col 3, line 53, "(pPBI-" should be -- (PPBI- --.
Col 4, line 11, "deeP" should be -- deep --.
Col 4, line 33, the first period should be a comma.
```

UNITED STATES PATENT AND TRADEMARK OFFICE
CERTIFICATE OF CORRECTION

PATENT NO. : 5,008,346

DATED : April 16, 1991

INVENTOR(S) : Robert C. Evers et al

It is certified that error appears in the above-identified patent and that said Letters Patent is hereby corrected as shown below:

```
Col 5, line 22, "to" should be -- of --.
Col 5, line 23, "Polymers" should be -- polymers --.
Col 5, line 26, "Were" should be -- were --.
Col 5, line 29, a comma should follow "cm-1".
Col 5, line 34, the comma should be a period.
Col 5, line 54, "coPolymer" should be -- copolymer --.
Col 5, line 57, delete the first left parenthesis.
Col 6, line 55, the period should be a comma.
```

Signed and Sealed this

Ninth Day of February, 1993

Attest:

STEPHEN G. KUNIN

*Attesting Officer*   Acting Commissioner of Patents and Trademarks